US012490012B2

(12) United States Patent
Pan et al.

(10) Patent No.: US 12,490,012 B2
(45) Date of Patent: Dec. 2, 2025

(54) HEADPHONE DEVICE

(71) Applicant: PRIMAX ELECTRONICS LTD., Taipei (TW)

(72) Inventors: Yung-Tai Pan, Taipei (TW); Chun-Nan Su, Taipei (TW); Chun-Che Wu, Taipei (TW); Ming-Fu Kung, Taipei (TW); Yao-Chung Hsieh, Taipei (TW); Jyun-Ci Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 147 days.

(21) Appl. No.: 18/631,101

(22) Filed: Apr. 10, 2024

(65) Prior Publication Data

US 2025/0287130 A1 Sep. 11, 2025

(30) Foreign Application Priority Data

Mar. 11, 2024 (TW) ................................ 113108864

(51) Int. Cl.
*H04R 1/10* (2006.01)
*H04R 5/033* (2006.01)

(52) U.S. Cl.
CPC ......... *H04R 1/1041* (2013.01); *H04R 1/1008* (2013.01); *H04R 1/105* (2013.01); *H04R 1/1058* (2013.01); *H04R 1/1066* (2013.01); *H04R 5/0335* (2013.01); *H04R 2201/107* (2013.01)

(58) Field of Classification Search
CPC .... H04R 1/1008; H04R 1/1041; H04R 1/105; H04R 1/1058; H04R 1/1066; H04R 5/0335; H04R 2201/107
See application file for complete search history.

(56) References Cited

U.S. PATENT DOCUMENTS 4,783,822 A * 11/1988 Toole .................. H04R 5/0335 2/209
2009/0323978 A1* 12/2009 Leske .................... H04R 1/105 381/72
2010/0189303 A1* 7/2010 Danielson ............ H04R 1/1008 381/378

* cited by examiner

*Primary Examiner* — Huyen D Le
(74) *Attorney, Agent, or Firm* — WPAT, PC

(57) ABSTRACT

A headphone device includes a first earmuff assembly, a second earmuff assembly, an arc-shaped connecting strip and a clamping force adjustment mechanism. The arc-shaped connecting strip is connected with the first earmuff assembly and the second earmuff assembly. The clamping force adjustment mechanism includes a first pressing plate, a second pressing plate, a slide block, a knob and a bolt. The arc-shaped connecting strip is clamped between the first pressing plate and the second pressing plate. The slide block is accommodated within an accommodation recess of the knob. The bolt is penetrated through the arc-shaped connecting strip and the second pressing plate and tightened into the slide block. While the slide block is driven by the knob and moved upwardly or downwardly along the bolt, a distance between the first pressing plate and the second pressing plate is changed, and the arc-shaped connecting strip is subjected to deformation.

10 Claims, 7 Drawing Sheets

HEADPHONE DEVICE

FIELD OF THE INVENTION

The present invention relates to a headphone device, and more particularly to a headphone device with a clamping force adjustment mechanism.

BACKGROUND OF THE INVENTION

The structure of existing headphone device mainly comprises an arc-shaped connecting strip, a first earmuff assembly and a second earmuff assembly. The arc-shaped connecting strip is arranged between the first earmuff assembly and the second earmuff assembly. Due to the arc-shaped structure and the retractable elastic force of the arc-shaped connecting strip, the user's head can be clamped by the two earmuff assemblies. However, since the conventional headphone device lacks a mechanism of adjusting the clamping force, the conventional headphone device cannot adapt to different users. In addition, the user cannot self-adjust the conventional headphone device to an appropriate or comfortable clamping state. Therefore, the existing design needs to be further improved.

SUMMARY OF THE INVENTION

In order to overcome the drawbacks of the conventional technologies, the present invention provides a headphone device with a clamping force adjustment mechanism. In response to the deformation of the arc-shaped connecting strip between two earmuff assemblies, the clamping force for clamping the user's head by the two earmuff assemblies can be adjusted.

In accordance with an aspect of the present invention, a headphone device is provided. The headphone device includes a first earmuff assembly, a second earmuff assembly, an arc-shaped connecting strip and a clamping force adjustment mechanism. The first earmuff assembly includes a first speaker. The second earmuff assembly includes a second speaker. The arc-shaped connecting strip is connected with the first earmuff assembly and the second earmuff assembly. The arc-shaped connecting strip has a first opening. The clamping force adjustment mechanism includes a first pressing plate, a second pressing plate, a slide block, a knob and a bolt. The second pressing plate has a second opening. The arc-shaped connecting strip is clamped between the first pressing plate and the second pressing plate. The slide block is located beside a side of the second pressing plate away from the arc-shaped connecting strip. A center of the slide block has a first screw hole. The knob is located beside a side of the slide block away from the second pressing plate. A center of the knob has an accommodation recess. The slide block is accommodated within the accommodation recess. A center of the accommodation recess has a third opening. As the knob is rotated, the slide block is synchronously rotated through the accommodation recess. The bolt includes a head part and a first threaded part. The head part is fixed on the first pressing plate. The first threaded part is penetrated through the first opening and the second opening and tightened into the first screw hole. While the slide block is driven by the knob and the slide block is moved upwardly or downwardly along the bolt, a distance between the first pressing plate and the second pressing plate is changed, and an appearance of the arc-shaped connecting strip is subjected to deformation.

In an embodiment, the first pressing plate further includes a first mounting hole, and the head part of the bolt is installed in the first mounting hole.

In an embodiment, plural first longitudinal grooves are formed in an inner periphery region of the first mounting hole, and plural second longitudinal grooves are formed in an outer periphery region of the head part of the bolt. The plural first longitudinal grooves of the first mounting hole and the plural second longitudinal grooves of the head part of the bolt match and complement each other in appearance and size.

In an embodiment, the clamping force adjustment mechanism further includes the at least one positioning post, each of the at least one positioning post includes a head part, the first pressing plate further includes at least one second mounting hole, the arc-shaped connecting strip further includes at least one first positioning hole, and the second pressing plate further includes at least one second positioning hole. After the head part of each positioning post is installed in the corresponding second mounting hole, the positioning post is penetrated through the corresponding first positioning hole and inserted into the corresponding second positioning hole.

In an embodiment, the headphone device further includes a casing, at least one screw and at least one stud. The first pressing plate further includes at least one third mounting hole. The at least one stud is disposed on an inner side of the casing. Each of the at least one screw is penetrated through the corresponding third mounting hole and tightened into the corresponding stud. Consequently, the first pressing plate is fixed on the casing.

In an embodiment, the headphone device further includes a gasket and a nut. The gasket includes a fourth opening. The bolt further includes a second threaded part. The first threaded part of the bolt is arranged between the head part and the second threaded part of the bolt. After the second threaded part of the bolt is penetrated through the first opening of the arc-shaped connecting strip, the second opening of the second pressing plate, the first screw hole of the slide block, the third opening of the knob and the fourth opening of the gasket sequentially, the second threaded part of the bolt is tightened into the nut.

In an embodiment, the headphone device further includes an intermediate connecting element, and the arc-shaped connecting strip and the first earmuff assembly are connected with each other through the intermediate connecting element.

In an embodiment, the intermediate connecting element is a yoke.

In an embodiment, the slide block is permitted to be slid within the accommodation recess.

In an embodiment, an inner periphery region of the accommodation recess and an outer periphery region of the slide block match and complement each other in appearance and size. A cross section of the inner periphery region of the accommodation recess has a polygonal shape, an arcuate shape or an irregular shape. A cross section of the outer periphery region of the slide block has the polygonal shape, the arcuate shape or the irregular shape.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
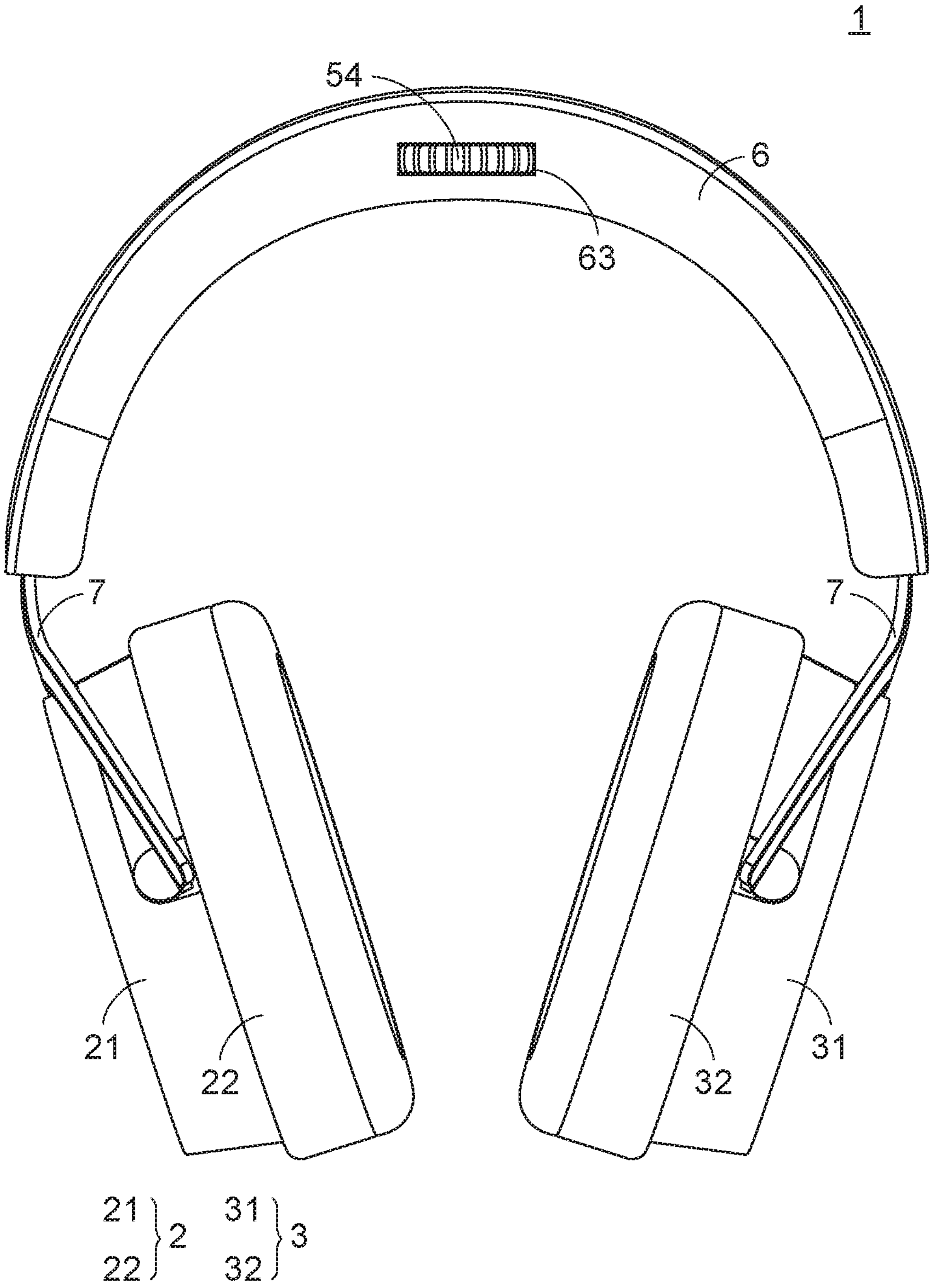
FIG. 1 is a schematic perspective view illustrating the structure of a headphone device according to a first embodiment of the present invention.
Figure 2:
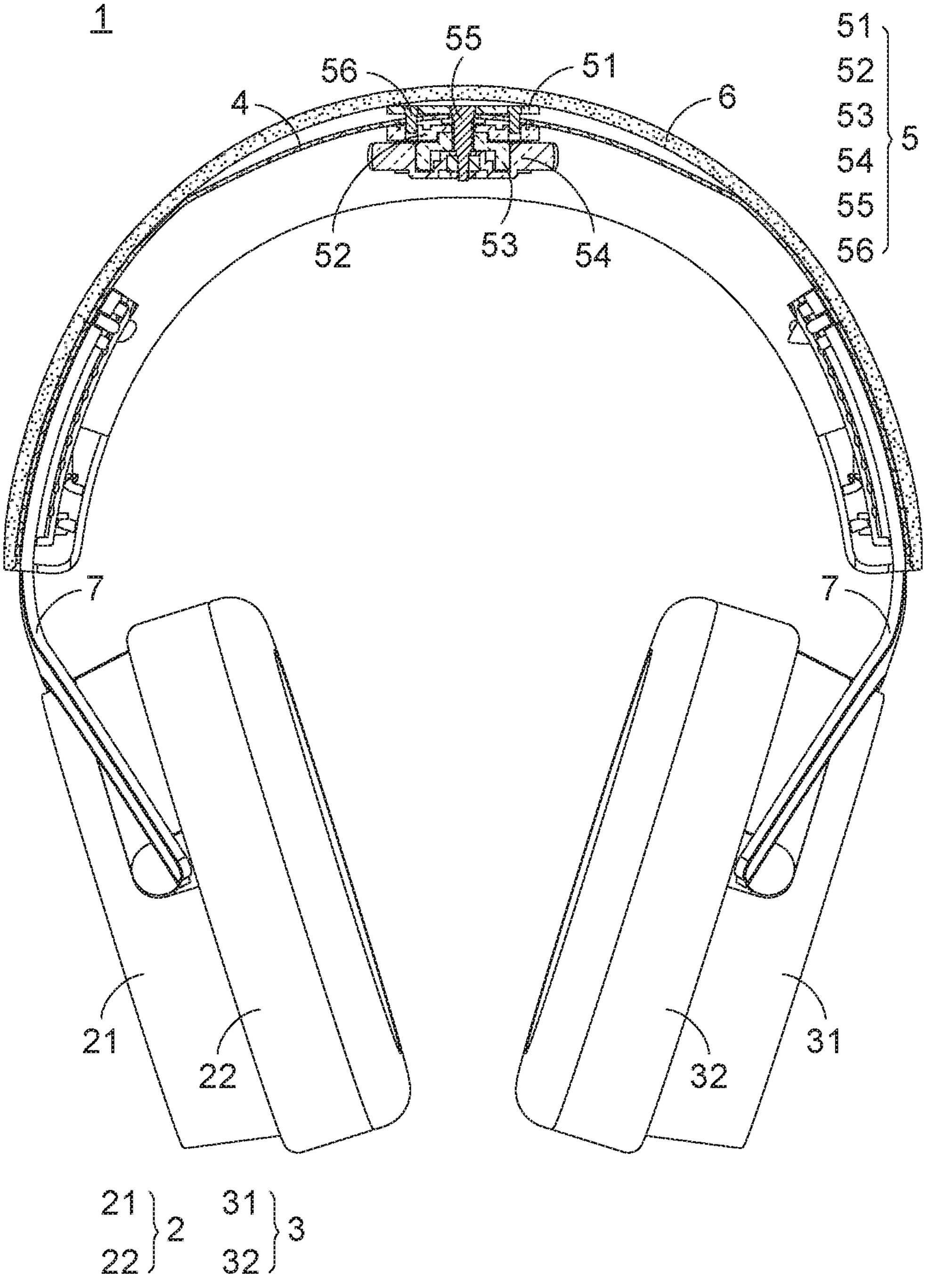
FIG. 2 is a schematic cutaway view illustrating a portion of the headphone device shown in FIG. 1.
Figure 3:
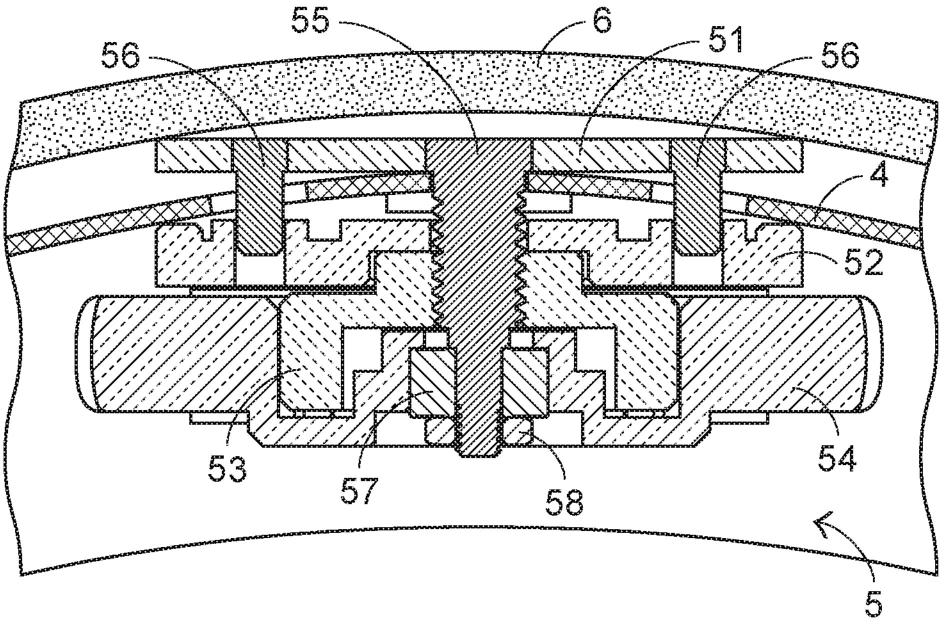
FIG. 3 is a schematic cross-sectional view illustrating the inner structure of the headphone device shown in FIG. 2, in which the arc-shaped connecting strip is not tightly pressed by the first pressing plate and the second pressing plate of the clamping force adjustment mechanism.
Figure 4:
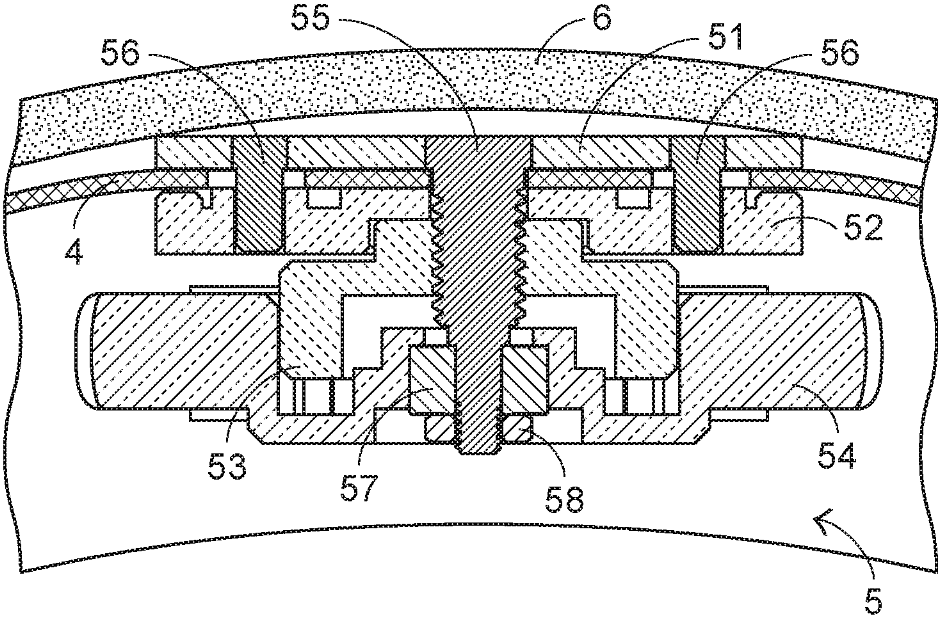
FIG. 4 is a schematic cross-sectional view illustrating the inner structure of the headphone device shown in FIG. 2, in which the arc-shaped connecting strip is tightly pressed by the first pressing plate and the second pressing plate of the clamping force adjustment mechanism.
Figure 5:
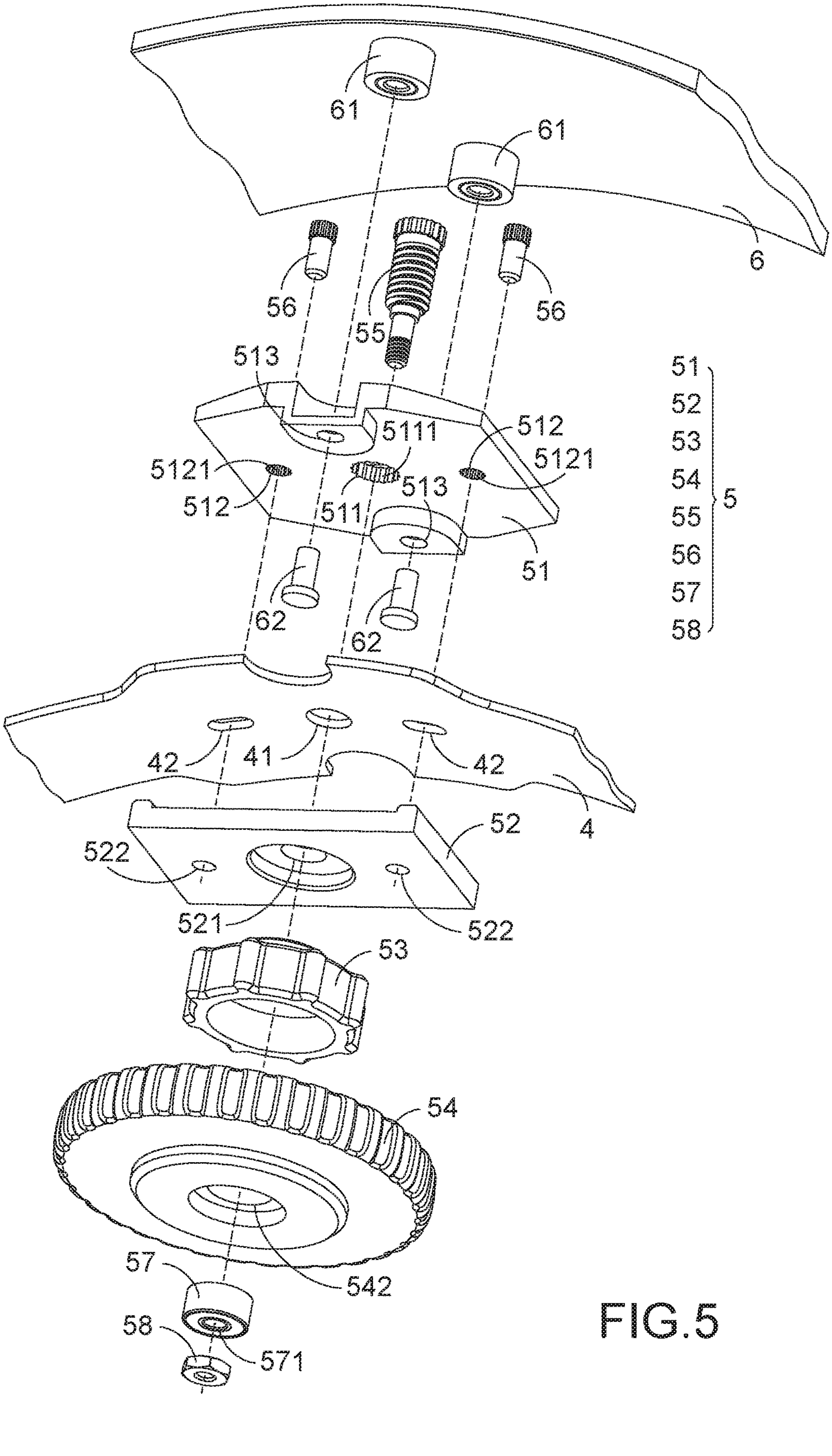
FIG. 5 is a schematic exploded view illustrating the clamping force adjustment mechanism, the arc-shaped connecting strip and the casing in the headphone device according to the first embodiment of the present invention and taken along a viewpoint.
Figure 6:
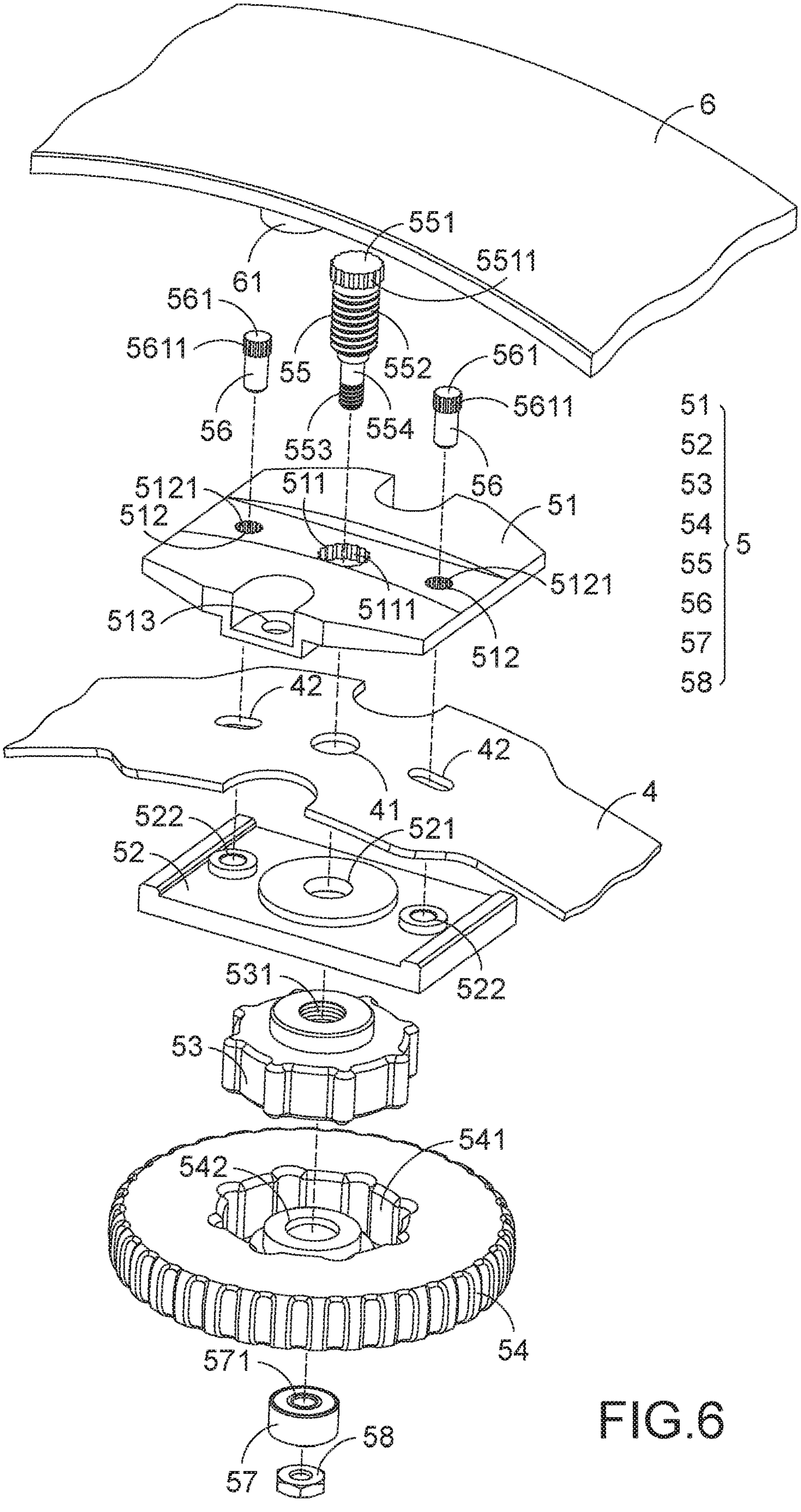
FIG. 6 is a schematic exploded view illustrating the clamping force adjustment mechanism, the arc-shaped connecting strip and the casing in the headphone device according to the first embodiment of the present invention and taken along another viewpoint.
Figure 7:
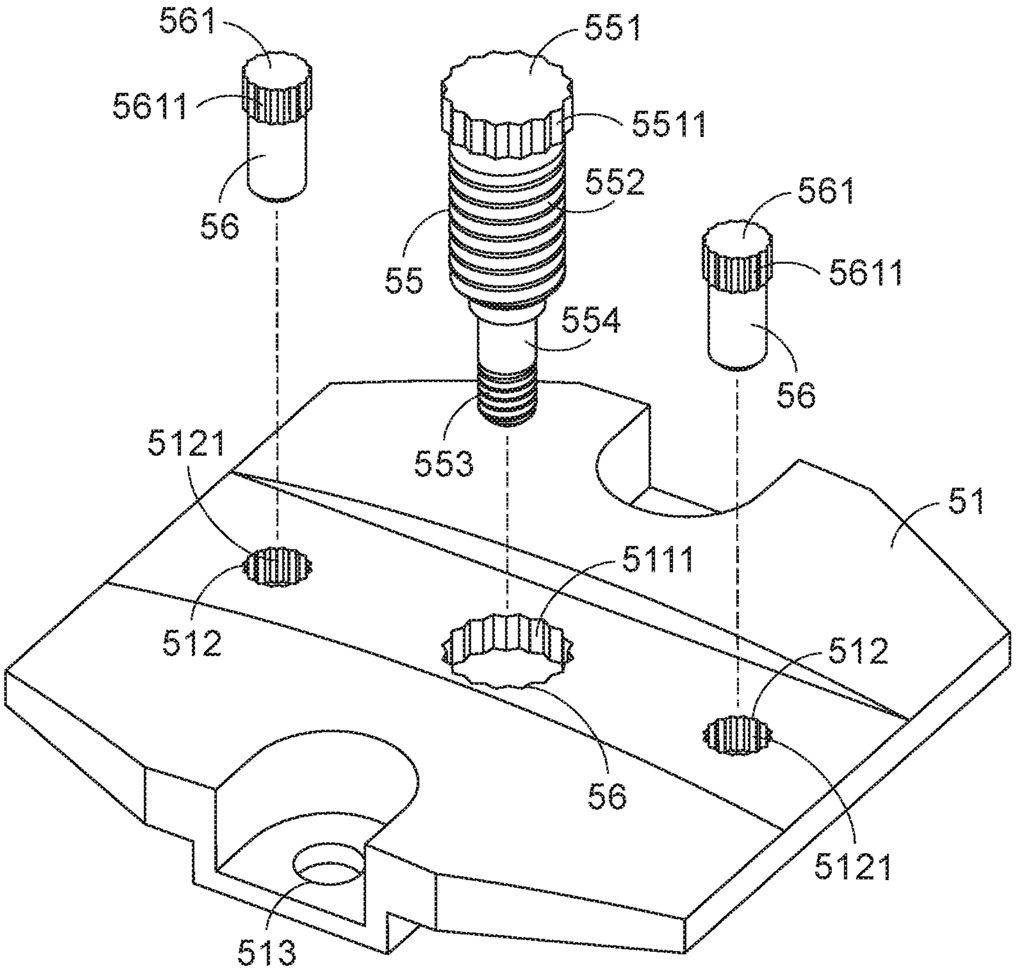
FIG. 7 is a schematic enlarged view illustrating the first pressing plate, the positioning post and the nut in the headphone device according to the first embodiment of the present invention.
Figure 8:
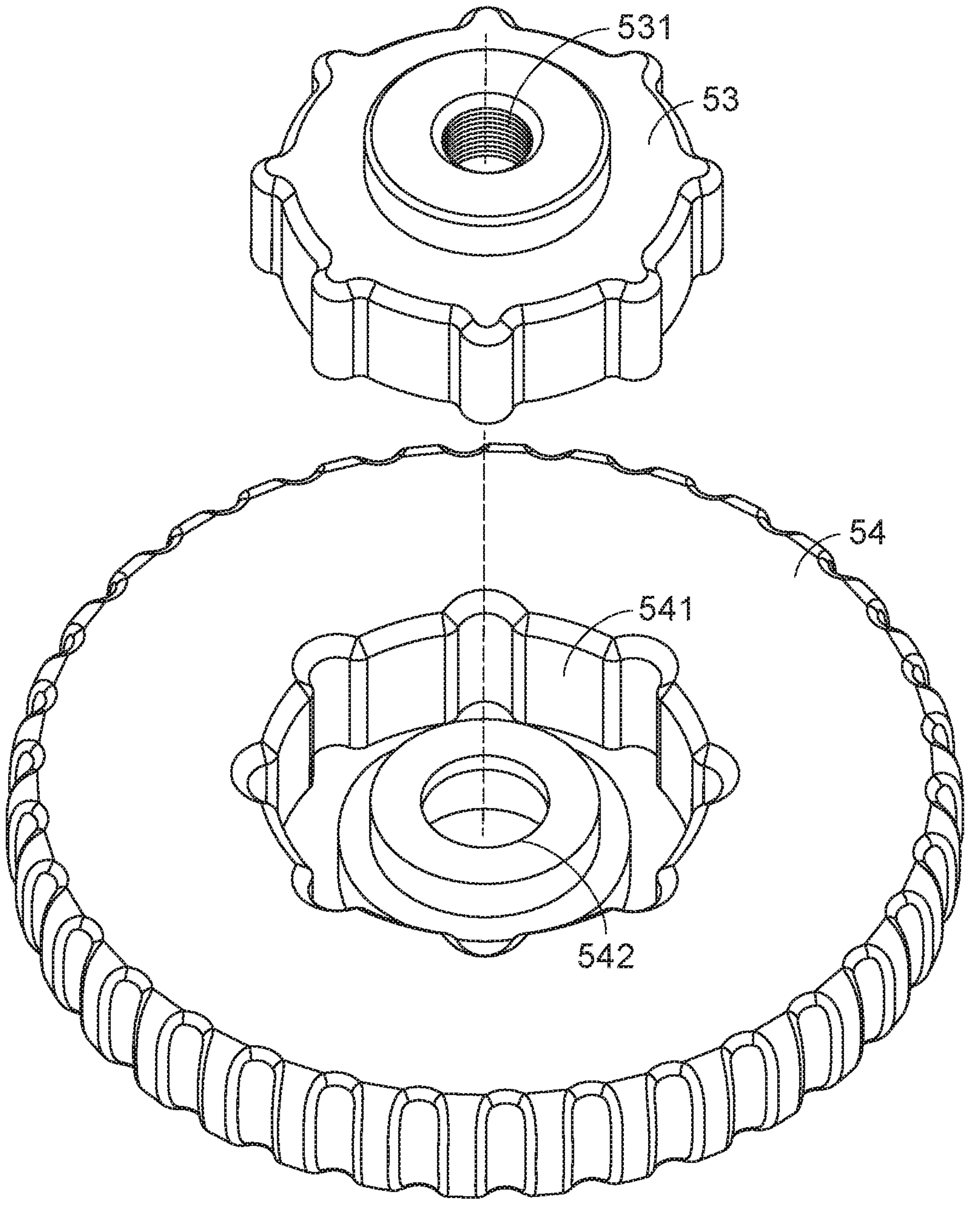
FIG. 8 is a schematic enlarged view illustrating the slide block and the knob in the headphone device according to the first embodiment of the present invention.

FIG. 1 is a schematic perspective view illustrating the structure of a headphone device according to a first embodiment of the present invention. FIG. 2 is a schematic cutaway view illustrating a portion of the headphone device shown in FIG. 1. FIG. 3 is a schematic cross-sectional view illustrating the inner structure of the headphone device shown in FIG. 2, in which the arc-shaped connecting strip is not tightly pressed by the first pressing plate and the second pressing plate of the clamping force adjustment mechanism. FIG. 4 is a schematic cross-sectional view illustrating the inner structure of the headphone device shown in FIG. 2, in which the arc-shaped connecting strip is tightly pressed by the first pressing plate and the second pressing plate of the clamping force adjustment mechanism. FIG. 5 is a schematic exploded view illustrating the clamping force adjustment mechanism, the arc-shaped connecting strip and the casing in the headphone device according to the first embodiment of the present invention and taken along a viewpoint. FIG. 6 is a schematic exploded view illustrating the clamping force adjustment mechanism, the arc-shaped connecting strip and the casing in the headphone device according to the first embodiment of the present invention and taken along another viewpoint. FIG. 7 is a schematic enlarged view illustrating the first pressing plate, the positioning post and the nut in the headphone device according to the first embodiment of the present invention. FIG. 8 is a schematic enlarged view illustrating the slide block and the knob in the headphone device according to the first embodiment of the present invention.

In FIGS. 1 to 8, a headphone device 1 according to the first embodiment of the present invention is shown. The headphone device 1 comprises a first earmuff assembly 2, a second earmuff assembly 3, an arc-shaped connecting strip 4, a clamping force adjustment mechanism 5 and a casing 6.

The first earmuff assembly 2 comprises a first speaker 21 and a first cover 22. The second earmuff assembly 3 comprises a second speaker 31 and a second cover 32.

The arc-shaped connecting strip 4 is connected with the first earmuff assembly 2 and the second earmuff assembly 3. The arc-shaped connecting strip 4 is directly or indirectly connected with the first earmuff assembly 2 or the second earmuff assembly 3.

In the direct connecting manner, the arc-shaped connecting strip 4 is directly extended from both sides and fixed on the first earmuff assembly 2 and the second earmuff assembly 3. In the indirect connecting manner, at least one intermediate connecting element 7 is additionally arranged between the arc-shaped connecting strip 4 and the first earmuff assembly 2 or between the arc-shaped connecting strip 4 and the second earmuff assembly 3.

In an embodiment, the intermediate connecting element 7 is a yoke. As shown in FIG. 2, the arc-shaped connecting strip 4 and the first earmuff assembly 2 are connected with each other through one intermediate connecting element 7, and the arc-shaped connecting strip 4 and the second earmuff assembly 3 are connected with each other through another intermediate connecting element 7.

In another embodiment, the intermediate connecting element 7 is a slide track or a slide groove. Through the slide track or the slide groove, the distance between the arc-shaped connecting strip 4 and the first earmuff assembly 2 or the distance between the arc-shaped connecting strip 4 and the second earmuff assembly 3 is adjustable. It is noted that the example of the intermediate connecting element 7 is not restricted.

In an embodiment, the arc-shaped connecting strip 4 has an arc-shaped appearance in whole or in part. In addition, the arc-shaped connecting strip 4 is arranged to have a curved or bent arc-shaped appearance at least at the portion in contact with a first pressure plate 51 and a second pressure plate 52.

The arc-shaped connecting strip 4 has a first opening 41 and at least one first positioning hole 42. In an embodiment, the arc-shaped connecting strip 4 has two first positioning holes 42. The two first positioning holes 42 are respectively located beside two sides of the first opening 41.

The clamping force adjustment mechanism 5 comprises the first pressing plate 51, the second pressing plate 52, a slide block 53, a knob 54, a bolt 55, at least one positioning post 56, a gasket 57 and a nut 58.

The first pressing plate 51 has a first mounting hole 511 and at least one second mounting hole 512. In addition, plural parallel longitudinal grooves 5111 and 5121 are formed in the inner periphery regions of the first mounting hole 511 and the at least one second mounting hole 512. In an embodiment, the first pressing plate 51 has two second mounting holes 512. The two second mounting holes 512 are respectively located beside the two sides of the first mounting hole 511.

The second pressing plate 52 has a second opening 521 and at least one second positioning hole 522. In an embodiment, the second pressing plate 52 has two second positioning holes 522. The two second positioning holes 522 are respectively located beside the two sides of the second opening 521.

The arc-shaped connecting strip 4 is clamped between the first pressing plate 51 and the second pressing plate 52. In case that the distance between the first pressing plate 51 and the second pressing plate 52 is changed, the curvature of the arc-shaped connecting strip 4 is correspondingly changed. Consequently, the appearance of the arc-shaped connecting strip 4 is changed to a flat appearance or returned to its original curved appearance.

Please refer to FIGS. 2 to 6 again. As shown in the drawings, the slide block 53 is located under the second pressing plate 52. That is, the slide block 53 is located beside the side of the second pressing plate 52 opposed to (or away from) the arc-shaped connecting strip 4. The center of the slide block 53 has a first screw hole 531. The cross section of the outer periphery region of the slide block 53 has a polygonal shape, an arcuate shape or an irregular shape. In this embodiment, the cross section of the outer periphery region of the slide block 53 has a plum blossom shape.

Please refer to FIGS. 2 to 6 again. The knob 54 is located under the slide block 53. That is, the knob 54 is located beside the side of the slide block 53 opposed to (or away from) the second pressing plate 52. The knob 54 has an accommodation recess 541 in the center. The slide block 53 can be accommodated within the accommodation recess 541. In addition, the slide block 53 is permitted to be slid within the accommodation recess 541. The cross section of the inner periphery region of the accommodation recess 541 has a polygonal shape, an arcuate shape or an irregular shape. In addition, the inner periphery region of the accommodation recess 541 and the outer periphery region of the slide block 53 match and complement each other in appearance and size. In this embodiment, the cross section of the inner periphery region of the accommodation recess 541 has a plum blossom shape. In addition, the center of the accommodation recess 541 has a third opening 542.

The bolt 55 comprises a head part 551, a first threaded part 552 and a second threaded part 553. The head part 551 and the second threaded part 553 are respectively located at two ends of the bolt 55. The first threaded part 552 is arranged between the head part 551 and the second threaded part 553. In addition, plural parallel longitudinal grooves 5511 are formed in the outer periphery region of the head part 551 of the bolt 55. In an embodiment, there is a spacing interval 554 between the first threaded part 552 and the second threaded part 553. In addition, there is no threaded structure in the region of the spacing interval 554. Preferably but not exclusively, the diameter of the first threaded part 552 is larger than the diameter of the second threaded part 553.

The head part 551 of the bolt 55 can be installed and fixed in the first mounting hole 511 of the first pressing plate 51. As mentioned above, the plural parallel longitudinal grooves 5511 are formed in the outer periphery region of the head part 551 of the bolt 55, and the plural parallel longitudinal grooves 5111 are formed in the inner periphery region of the first mounting hole 511 of the first pressing plate 51. The parallel longitudinal grooves 5511 of the head part 551 and the parallel longitudinal grooves 5111 of the first mounting hole 511 match and complement each other in appearance and size. Consequently, after the head part 551 of the bolt 55 is inserted into the first mounting hole 511 of the first pressing plate 51, the bolt 55 can be fixed on the first pressing plate 51, and the bolt 55 and the first pressing plate 51 will not be rotated relative to each other. In some other embodiments, the head part 551 of the bolt 55 and the first mounting hole 511 of the first pressing plate 51 have other matching shapes such as a polygonal shape, an arcuate shape or an irregular shape. Consequently, after installation, the bolt 55 and the first pressing plate 51 will not be rotated relative to each other.

In the process of assembling the clamping force adjustment mechanism 5, the first threaded part 552 of the bolt 55 is penetrated through the first opening 41 of the arc-shaped connecting strip 4 and the second opening 521 of the second pressing plate 52 sequentially, and then tightened into the first screw hole 531 of the slide block 53. The threaded structure of the first screw hole 531 of the slide block 53 and the threaded structure of the first threaded part 552 of the bolt 55 match each other. Consequently, the slide block 53 and the bolt 55 can be rotated relative to each other.

After the clamping force adjustment mechanism 5 is assembled, the slide block 53 can be moved along the first threaded part 552 of the bolt 55. In case that the slide block 53 is moved along the first threaded part 552 of the bolt 55 in the direction toward the arc-shaped connecting strip 4, the arc-shaped connecting strip 4 is pressed by the second pressing plate 52 and the first pressing plate 51. Consequently, the arc-shaped connecting strip 4 is subjected to deformation. During this process, the appearance of the arc-shaped connecting strip 4 will be changed from a curvy appearance to a flat appearance. Whereas, in case that the slide block 53 is moved along the first threaded part 552 of the bolt 55 in the direction away from the arc-shaped connecting strip 4, the arc-shaped connecting strip 4 is slightly pressed or not pressed by the second pressing plate 52 and the first pressing plate 51. During this process, the appearance of the contact portion between the arc-shaped connecting strip 4 and the first pressing plate 51 and the appearance of the contact region between the arc-shaped connecting strip 4 and the second pressing plate 52 will be changed from the flat appearance to the curvy appearance.

As mentioned above, the two ends of the arc-shaped connecting strip 4 are respectively connected with the first earmuff assembly 2 and the second earmuff assembly 3. Once the appearance of the arc-shaped connecting strip 4 is subjected to the deformation, the distance between the first earmuff assembly 2 and the second earmuff assembly 3 is correspondingly changed, for example increased or decreased. Correspondingly, the magnitude of the clamping force for clamping the user's head by the first earmuff assembly 2 and the second earmuff assembly 3 will be subjected to changes. For example, the clamping effect in response to the clamping force becomes looser or tighter.

In accordance with a feature of the present invention, the slide block 53 is not moved by the user directly. In fact, the user drives the movement of the slide block 53 through the knob 54 that can be rotated in place. As mentioned above, the cross section of the outer periphery region of the slide block 53 has a plum blossom shape, and the cross section of the inner periphery region of the accommodation recess 541 of the knob 54 has a plum blossom shape. The appearance of the cross section of the outer periphery region of the slide block 53 and the appearance of the cross section of the inner periphery region of the accommodation recess 541 match each other. Consequently, when the knob 54 is rotated by the user, the slide block 53 is synchronously rotated with the accommodation recess 541 of the knob 54. While the slide block 53 is rotated and moved upwardly or downwardly along the bolt 55, the distance between the first pressing plate 51 and the second pressing plate 52 is changed, and the appearance of the arc-shaped connecting strip 4 is subjected to the deformation.

The clamping force adjustment mechanism 5 is installed and disposed within the casing 6. As shown in FIG. 5, the at least one stud 61 is disposed on an inner side of the casing 6, and the first pressing plate 51 further comprises at least one third mounting hole 513. After a screw 62 is penetrated through the third mounting hole 513 of the first pressing plate 51 and tightened into the corresponding stud 61, the first pressing plate 51 of the clamping force adjustment mechanism 5 is fixed on the casing 6.

The casing 6 is generally arc-shaped and has a hollow structure for receiving the arc-shaped connecting strip 4, the clamping force adjustment mechanism 5 and a portion of the intermediate connecting element 7. The casing 6 comprises a hollow part 63. A portion of the knob 54 of the clamping force adjustment mechanism 5 is exposed outside the hollow part 63 of the casing 6. Consequently, the knob 54 can be rotated by the user. In response to the rotation of the knob 54, the magnitude of the clamping force for clamping the user's head by the first earmuff assembly 2 and the second earmuff assembly 3 is adjustable. Moreover, during the adjustment process, the knob 54 is only rotated in place and not moved upwardly or downwardly along the bolt 55. Due to this design, the knob 54 will not get stuck in the hollow part 63 while being moved upwardly or downwardly. In addition, the area of the hollow part 63 is not too large to influence the overall appearance of the headphone device 1. Furthermore, except that the knob 54 is partially exposed outside, the other components of the clamping force adjustment mechanism 5 are hidden in the casing 6. Due to this structural design, the risk of entangling the user's hair or clamping the user's scalp will be largely reduced.

In accordance with another feature of the present invention, the associated structures of the headphone device 1 are specially designed. Consequently, in the process of adjusting the clamping force, the relative rotation between the first pressing plate 51, the arc-shaped connecting strip 4 and the second pressing plate 52 is avoided, or the relative rotation extent is reduced. For example, the clamping force adjustment mechanism 5 further comprises the at least one positioning post 56, the first pressing plate 51 comprises at least one corresponding second mounting hole 512, the arc-shaped connecting strip 4 comprises the at least one corresponding first positioning hole 42, and the second pressing plate 52 comprises the at least one corresponding second positioning hole 522. The positioning post 56 comprises a head part 561. In addition, plural parallel longitudinal grooves 5611 are formed in the outer periphery region of the head part 561 of the positioning post 56, and plural parallel longitudinal grooves 5121 are formed in the inner periphery region of the second mounting hole 512 of the first pressing plate 51. The parallel longitudinal grooves 5611 of the head part 561 and the parallel longitudinal grooves 5121 of the second mounting hole 512 match and complement each other in appearance and size. Consequently, after the head part 561 of the positioning post 56 is inserted into the second mounting hole 512 of the first pressing plate 51, the positioning post 56 can be fixed on the first pressing plate 51, and the positioning post 56 and the first pressing plate 51 will not be rotated relative to each other.

Furthermore, in the process of assembling the clamping force adjustment mechanism 5, the positioning post 56 fixed on the first pressing plate 51 is penetrated through corresponding first positioning hole 42 of the arc-shaped connecting strip 4 and then inserted into the corresponding second positioning hole 522 of the second pressing plate 52. Consequently, the relative rotation between the first pressing plate 51, the arc-shaped connecting strip 4 and the second pressing plate 52 is avoided, or the relative rotation extent is reduced.

In an embodiment, the clamping force adjustment mechanism 5 further comprises the gasket 57 and the nut 58. The gasket 57 comprises a fourth opening 571. In the process of assembling the components of the clamping force adjustment mechanism 5, the second threaded part 553 of the bolt 55 is penetrated through the first opening 41 of the arc-shaped connecting strip 4, the second opening 521 of the second pressing plate 52, the first screw hole 531 of the slide block 53, the third opening 542 of the knob 54 and the fourth opening 571 of the gasket 57 sequentially, and then tightened into the nut 58. Consequently, the knob 54, the slide block 53, the second pressing plate 52, the arc-shaped connecting strip 4 and the first pressing plate 51 are combined together.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A headphone device, comprising:

a first earmuff assembly comprising a first speaker;

a second earmuff assembly comprising a second speaker;

an arc-shaped connecting strip connected with the first earmuff assembly and the second earmuff assembly, wherein the arc-shaped connecting strip has a first opening; and a clamping force adjustment mechanism comprising:

a first pressing plate;

a second pressing plate having a second opening, wherein the arc-shaped connecting strip is clamped between the first pressing plate and the second pressing plate;

a slide block located beside a side of the second pressing plate away from the arc-shaped connecting strip, and a center of the slide block has a first screw hole;

a knob located beside a side of the slide block away from the second pressing plate, wherein a center of the knob has an accommodation recess, the slide block is accommodated within the accommodation recess, and a center of the accommodation recess has a third opening, wherein as the knob is rotated, the slide block is synchronously rotated through the accommodation recess; and a bolt comprising a head part and a first threaded part, wherein the head part is fixed on the first pressing plate, and the first threaded part is penetrated through the first opening and the second opening and tightened into the first screw hole, wherein while the slide block is driven by the knob and the slide block is moved upwardly or downwardly along the bolt, a distance between the first pressing plate and the second pressing plate is changed, and an appearance of the arc-shaped connecting strip is subjected to deformation.

2. The headphone device according to claim 1, wherein the first pressing plate further comprises a first mounting hole, and the head part of the bolt is installed in the first mounting hole.

3. The headphone device according to claim 2, wherein plural first longitudinal grooves are formed in an inner periphery region of the first mounting hole, and plural second longitudinal grooves are formed in an outer periphery region of the head part of the bolt, wherein the plural first longitudinal grooves of the first mounting hole and the plural second longitudinal grooves of the head part of the bolt match and complement each other in appearance and size.

4. The headphone device according to claim 1, wherein the clamping force adjustment mechanism further comprises the at least one positioning post, each of the at least one positioning post comprises a head part, the first pressing plate further comprises at least one second mounting hole, the arc-shaped connecting strip further comprises at least one first positioning hole, and the second pressing plate further comprises at least one second positioning hole, wherein after the head part of each positioning post is installed in the corresponding second mounting hole, the positioning post is penetrated through the corresponding first positioning hole and inserted into the corresponding second positioning hole.

5. The headphone device according to claim 1, wherein the headphone device further comprises a casing, at least one screw and at least one stud, wherein the first pressing plate further comprises at least one third mounting hole, and the at least one stud is disposed on an inner side of the casing, wherein each of the at least one screw is penetrated through the corresponding third mounting hole and tightened into the corresponding stud, so that the first pressing plate is fixed on the casing.

6. The headphone device according to claim 1, wherein the headphone device further comprises a gasket and a nut, wherein the gasket comprises a fourth opening, the bolt further comprises a second threaded part, and the first threaded part of the bolt is arranged between the head part and the second threaded part of the bolt, wherein after the second threaded part of the bolt is penetrated through the first opening of the arc-shaped connecting strip, the second opening of the second pressing plate, the first screw hole of the slide block, the third opening of the knob and the fourth opening of the gasket sequentially, the second threaded part of the bolt is tightened into the nut.

7. The headphone device according to claim 1, wherein the headphone device further comprises an intermediate connecting element, and the arc-shaped connecting strip and the first earmuff assembly are connected with each other through the intermediate connecting element.

8. The headphone device according to claim 7, wherein the intermediate connecting element is a yoke.

9. The headphone device according to claim 1, wherein the slide block is permitted to be slid within the accommodation recess.

10. The headphone device according to claim 1, wherein an inner periphery region of the accommodation recess and an outer periphery region of the slide block match and complement each other in appearance and size, wherein a cross section of the inner periphery region of the accommodation recess has a polygonal shape, an arcuate shape or an irregular shape, and a cross section of the outer periphery region of the slide block has the polygonal shape, the arcuate shape or the irregular shape.

* * * * *